(12) United States Patent
Pho et al.

(10) Patent No.: US 9,639,396 B2
(45) Date of Patent: May 2, 2017

(54) STARVATION CONTROL IN A DATA PROCESSING SYSTEM

(71) Applicant: Freescale Semiconductor, Inc., Austin, TX (US)

(72) Inventors: Quyen Pho, Pflugerville, TX (US); William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 51 days.

(21) Appl. No.: 14/487,897

(22) Filed: Sep. 16, 2014

(65) Prior Publication Data
US 2016/0077870 A1    Mar. 17, 2016

(51) Int. Cl.
*G06F 9/48* (2006.01)

(52) U.S. Cl.
CPC .................. *G06F 9/4881* (2013.01)

(58) Field of Classification Search
CPC .. G06F 13/14; G06F 13/1605; G06F 13/1621; G06F 13/1626; G06F 13/1652; G06F 13/18; G06F 13/36; G06F 13/362; G06F 13/366; G06F 9/4881
See application file for complete search history.

(56) References Cited

U.S. PATENT DOCUMENTS

| | | | | |
|---|---|---|---|---|
| 6,574,230 B1* | 6/2003 | Almulhem | .......... | H04L 12/5693 370/395.4 |
| 7,366,208 B2* | 4/2008 | Bowes | ............... | H04L 12/5601 370/419 |
| 7,992,137 B2* | 8/2011 | Rideout | ................ | G06F 11/362 714/25 |
| 8,046,768 B2 | 10/2011 | Smith et al. | | |
| 8,370,552 B2* | 2/2013 | Mittal | .................... | G06F 13/366 710/112 |
| 8,407,674 B2 | 3/2013 | Krauss | | |
| 8,514,874 B2 | 8/2013 | Mital et al. | | |
| 8,694,705 B2* | 4/2014 | Hara | ..................... | G06F 13/362 710/107 |

(Continued)

OTHER PUBLICATIONS

Lo, L., An Interactive Oriented Fair Scheduler with Bounded Starvation for Desktop Time-Shating Systems, Thesis, Tatung University, Jan. 2008, [retrieved on Dec. 18, 2015], 66 pages, Retrieved from the Internet: <URL:https://www.researchgate.net>.*

(Continued)

*Primary Examiner* — Geoffrey St Leger (57) ABSTRACT

A data processing system (100) includes a main list (126) of tasks, main scheduling scheme, a starvation list (128) of tasks, and a secondary scheduling scheme. A method identifies tasks in the main list that are potentially-starving tasks and places the potentially-starving tasks in the starvation list. A starvation monitor (130) controls starvation of tasks in the system by determining when to use the secondary scheduling scheme to schedule, for execution on a CPU (132), a highest priority task in the starvation list prior to scheduling, pursuant to the main scheduling scheme, other tasks in the main list. The starvation monitor determines a number of times that a task in the main list is pre-empted, by other tasks in the main list, from being scheduled for execution on the CPU. A counter (131) is incremented each occasion that any task not in the starvation list is executed on the CPU.

15 Claims, 8 Drawing Sheets

(56) References Cited

U.S. PATENT DOCUMENTS

| | | | |
|---|---|---|---|
| 8,966,173 B1* | 2/2015 | Taylor | G06F 12/14 |
| | | | 711/114 |
| 9,400,682 B2* | 7/2016 | Persikov | G06F 9/4881 |
| 2002/0083063 A1* | 6/2002 | Egolf | G06F 9/4881 |
| 2002/0138670 A1* | 9/2002 | Johnson | G06F 13/20 |
| | | | 710/6 |
| 2003/0016685 A1 | 1/2003 | Berggreen | |
| 2003/0097499 A1 | 5/2003 | Ennis | |
| 2004/0001502 A1 | 1/2004 | Garmire et al. | |
| 2004/0078794 A1 | 4/2004 | Burns et al. | |
| 2004/0216103 A1 | 10/2004 | Burky et al. | |
| 2005/0122966 A1* | 6/2005 | Bowes | H04L 12/5601 |
| | | | 370/360 |
| 2007/0226462 A1 | 9/2007 | Scott et al. | |
| 2009/0037774 A1* | 2/2009 | Rideout | G06F 11/362 |
| | | | 714/38.1 |
| 2009/0113432 A1* | 4/2009 | Singh | G06F 9/4881 |
| | | | 718/102 |
| 2010/0057998 A1 | 3/2010 | Moyer et al. | |
| 2010/0058000 A1 | 3/2010 | Moyer et al. | |
| 2010/0095036 A1* | 4/2010 | Mittal | G06F 13/366 |
| | | | 710/117 |
| 2011/0154344 A1* | 6/2011 | Avni | G06F 9/4881 |
| | | | 718/102 |
| 2011/0167427 A1* | 7/2011 | Yoo | G06F 9/4881 |
| | | | 718/103 |
| 2011/0320660 A1* | 12/2011 | Hara | G06F 9/50 |
| | | | 710/114 |
| 2012/0230341 A1 | 9/2012 | Mital et al. | |
| 2013/0042251 A1 | 2/2013 | Nader | |
| 2013/0326528 A1 | 12/2013 | Shankar et al. | |
| 2014/0033206 A1 | 1/2014 | Findeisen | |
| 2014/0123151 A1 | 5/2014 | Kishan et al. | |
| 2014/0157280 A1 | 6/2014 | Yamauchi et al. | |
| 2014/0165070 A1 | 6/2014 | Persikov et al. | |
| 2014/0201454 A1 | 7/2014 | Pho | |
| 2014/0215479 A1 | 7/2014 | Riemers | |

OTHER PUBLICATIONS

Hoganson, K., Reducing MLFQ scheduling starvation with feedback and exponential averaging, Journal of Computing Sciences in Colleges, vol. 25 Issue 2, Dec. 2009, pp. 196-202, [retrieved on Dec. 27, 2016], Retrieved from the Internet: <URL:http://dl.acm.org/>.*

Sabin, G., Unfairness in Parallel Job Scheduling, Dissertation, Ohio State University, 2006, 451 pages, [retrieved on Dec. 27, 2016], Retrieved from the Internet: <URL:https://etd.ohiolink.edu>.*

* cited by examiner

TIME →

| TASK | PRIORITY | 1 | 2 | 3 | 4 | 5 | 6 | 7 | 8 | 9 |
|---|---|---|---|---|---|---|---|---|---|---|
| A | 1 | READY | CPU | READY | CPU | READY | CPU | READY | READY | CPU |
| B | 2 | READY | READY | CPU | READY | READY | READY | CPU | READY | READY |
| C | 3 | READY | READY | READY | READY | CPU | READY | READY | READY | READY |
| D | 4 | READY | READY | READY | C,D | D | D | D | CPU | READY |
| STARVATION LIST | | NONE | B,C,D | C,D | C,D | D | D | D | NONE | B,C,D |
| COUNTER | | 0 | 1 | 2 | 3 | 1 | 2 | 3 | 0 | 1 |
| STARVED TASK | | NONE | B | C | C | D | D | D | NONE | B |
| CPU EXECUTING | | | TASK A | TASK B | TASK B | TASK C | TASK A | TASK A | TASK D | TASK A |

FIG. 18

TIME →

| TASK | PRIORITY | 1 | 2 | 3 | 4 | 5 | 6 | 7 | 8 | 9 |
|---|---|---|---|---|---|---|---|---|---|---|
| A | 1 | READY | CPU | READY | CPU | READY | CPU | READY | NOT READY | READY |
| B | 2 | READY | READY | CPU | READY | CPU | READY | CPU | NOT READY | READY |
| C | 3 | READY | READY | READY | READY | READY | READY | READY | CPU | READY |
| D | 4 | READY | READY | READY | READY | READY | READY | READY | READY | CPU |
| STARVATION LIST | | NONE | B,C,D | C,D | C,D | C,D | C,D | C,D | D | NONE |
| COUNTER | | 0 | 1 | 2 | 3 | 4 | 5 | 6 | 7 | 8 |
| STARVED TASK | | NONE | B | C | C | C | C | C | D | NONE |
| CPU EXECUTING | | | TASK A | TASK B | TASK A | TASK B | TASK A | TASK B | TASK C | TASK D |

STARVATION CONTROL IN A DATA PROCESSING SYSTEM

BACKGROUND

Field

This invention relates generally to data processing systems and more particularly to controlling starvation of tasks in a multi-task data processing system.

Related Art

Starvation of a lower-priority task in a multi-tasking data processing system occurs when such task does not obtain enough central processing unit (CPU) time or does not obtain any CPU time at all. A task includes an instruction thread. Starvation can be a permanent situation or a temporary situation. The larger a number of tasks that are assigned to a CPU, the greater is the probability that a starvation problem will arise. The longer a lifetime that a task has, the greater is the probability that such task will cause a starvation problem.

In its lifetime, each task may go through different states, such as un-assigned, ready-for-scheduling, executing and accelerating. The ready-for-scheduling state occurs when a task is ready to be scheduled for execution by a CPU. The executing state occurs when the instruction thread associated with a task is executed by the CPU. The accelerating state occurs when a task is performing an operation that does not involve the CPU. When a task is in the accelerating state, the task may relinquish the CPU to another task. A task can transition through more than one state, which transitioning can result in the task going in and coming out of the executing state several times until the task finishes.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one known data processing system, priority of a task is assigned when the task first enters the system. The oldest task, i.e., the first task that enters the system, is assigned the highest priority, and the youngest task, i.e., the last task that enters the system, is assigned the lowest priority. In another known system, priority of a task is assigned using other criteria. In any case, among tasks that are ready for scheduling, a task that has a higher priority is scheduled for execution prior to a task that has a lower priority. Thus, the priority is fixed for all tasks in the system during a period between when each task enters the system and when such task exits the system. Such a fixed priority scheme can potentially be a problem for a system. A lower priority task can be in a ready-for-scheduling state for a long time while higher priority tasks may have cycled through an executing state and an accelerating state many times, thereby denying the lower priority task an opportunity to access to a CPU.

With known scheduling paradigms, the oldest task is scheduled first. Although this paradigm works satisfactorily in some application environments, it does not work well in other application environments.

In an attempt to ensure that each task will run to completion, known priority schemes rely on the fact that a task has a limited lifetime, and, when it exits the system, the remaining ready-for-scheduling tasks will move higher in priority. However, known priority schemes do not necessarily prevent starvation. The more tasks running in a system and the longer time they are running, the higher the chance of starvation occurring for at least one lower-priority task. In known systems, a new task with high priority moves ahead of other older tasks that are still running in the system. As a result, in known systems, the lowest priority task continues to have the lowest priority (even if the lowest priority task is the oldest task) which could lead to the lowest priority task being starved indefinitely and never being completed.

Some known methods fix priority at the time a request is made. Typically, priority with such known methods is based on quality of service (QoS) or first-in first-out (FIFO) watermark levels to grant priority to a task that is most likely to be overflowed. The method in accordance with embodiments of the invention does not use watermarks.

Yet another known method acts on a task that is very active which can cause overflow in a first-in first-out (FIFO) storage. Therefore, to avoid losing messages, the one known method depends on a size of the FIFO storage. Consequently, the one known method is disadvantageously hardware dependent. The method in accordance with embodiments of the invention is hardware independent.

Known methods focus on a task that causes the starvation. Many known methods lower a priority of the task that causes the starvation. Known methods are disadvantageously intrusive because they change the original priority of a task. The method in accordance with embodiments of the invention does not change the original priority of a task.

Another known method uses a round-robin arbiter to skip over a task a fixed number of times based on its priority presented at request-time, relative to other client's request levels. Such a round robin scheduling scheme evenly grants a port to each task.

The method in accordance with embodiments of the invention uses two scheduling schemes: a main scheduling scheme and a secondary scheduling scheme. The method in accordance with embodiments of the invention selects, upon occurrence of certain conditions, the secondary scheduling scheme. The method in accordance with embodiments of the invention can be used when there are more than two tasks in a data processing system.

With the method in accordance with embodiments of the invention, a task is assigned a priority at the time it enters the data processing system. When a task enters the system, a CPU is notified that there is going to be a new instruction thread that needs to be executed, at which time, the task is graded with a priority value (hereinafter "priority") and with a lifetime. At the end of its lifetime, the task exits the system. During a lifetime of a task, the task maintains this priority.

Because more than one task can be in the ready-for-scheduling state at a same time, known methods decide which of these tasks to schedule for a CPU. A scheduling scheme selects a task with the highest priority from among the tasks in the ready-for-scheduling state, which is not necessarily a task that has been in the ready-for-scheduling state for the longest time. For example, task B may have been in the ready-for-scheduling state for a very long time, but as soon as task A enters the ready-for-scheduling state it will be scheduled ahead of task B if task A has a higher priority. On the other hand, with some known methods, a higher priority task can cycle through the ready-for-scheduling many times, thereby denying the grant to a lower priority task still waiting in the ready-for-scheduling state for all that time.

The method in accordance with embodiments of the invention does not consider how active a task is; instead, the method focuses on a task that is waiting in the ready-for-scheduling state for a very long time. Advantageously, the method in accordance with embodiments of the invention is not hardware dependent. The method in accordance with embodiments of the invention is software programmable because the method only affects performance.

The method in accordance with embodiments of the invention remembers a list of tasks that are in danger of starvation, and, when starvation occurs, the method picks, from the list of tasks that are in danger of starvation, the one (starved) task with the highest original priority, which is not necessarily the task that has been in the ready-for-scheduling state the longest time.

With the apparatus and method in accordance with embodiments of the invention, a secondary scheduling list of fixed-ordered tasks is maintained. The method in accordance with embodiments of the invention evaluates content of the secondary scheduling list. In one embodiment, the method in accordance with embodiments of the invention uses a counter or a timer (hereinafter "counter") to determine when to evaluate the secondary scheduling list. The method in accordance with embodiments of the invention performs task selection from the secondary scheduling list (hereinafter "starvation list") for one task only, and only when the counter reaches a threshold value, then the method returns to a main scheduling list (hereinafter "main list"). The main list is then used for an extended period of time. Therefore, any priority changes that are made by the method in accordance with embodiments of the invention are not permanent, nor do such priority changes affect the main list. The starvation list is updated in parallel with the main list if a task is scheduled from the main list before the counter reaches its threshold value.

The method in accordance with embodiments of the invention includes stored history information regarding the prior servicing of lower-priority tasks. Some known methods have a simpler scheme of modifying a round robin pointer based on a per-client skip count. Disadvantageously, such known methods do not preserve task age.

Figure 1:
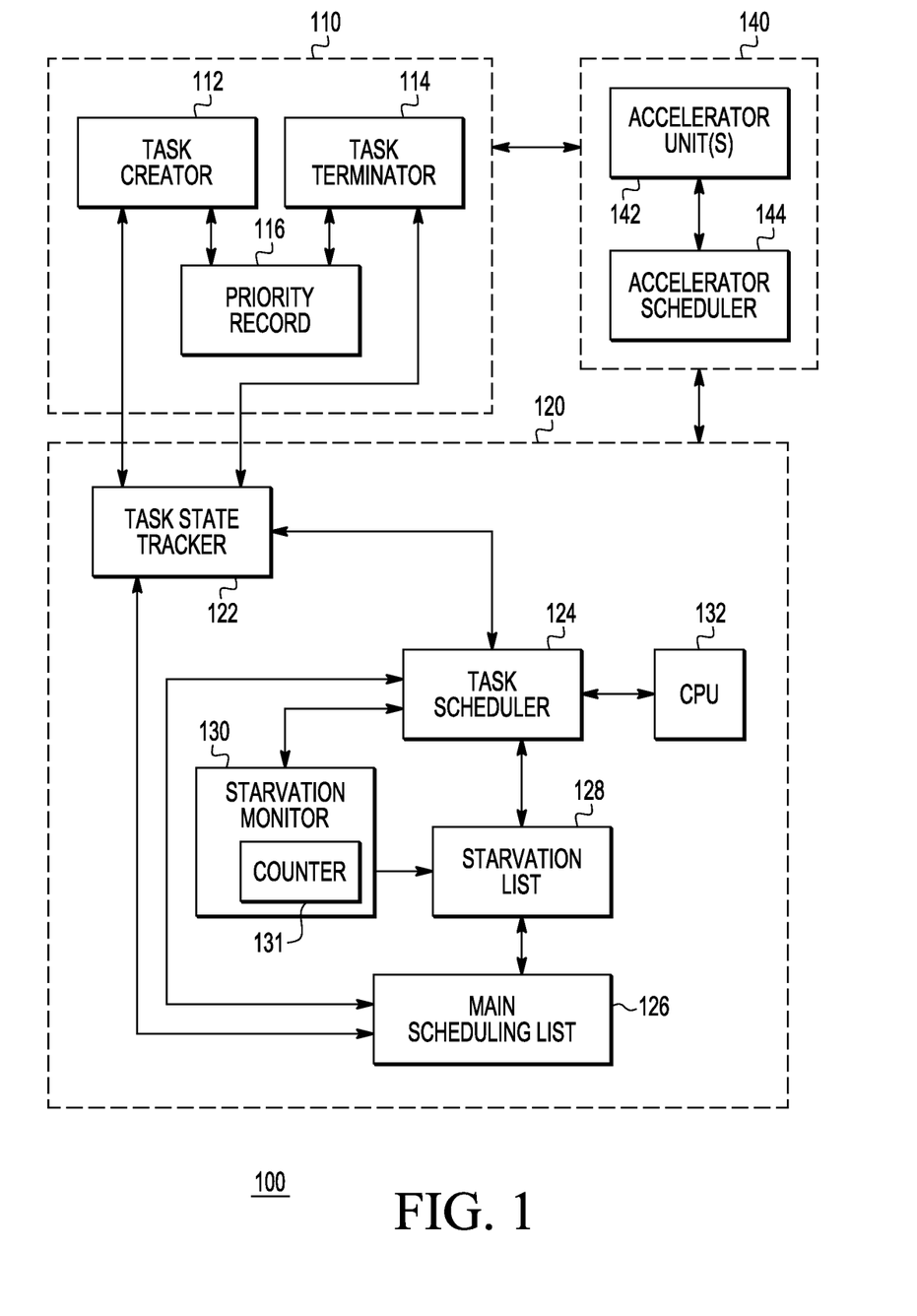
FIG. 1 is a simplified functional block diagram of a data processing system in accordance with one embodiment of the invention.

FIG. 1 is a simplified functional block diagram of a data processing system (hereinafter "system") 100 in accordance with one embodiment of the invention. The system 100 includes a global task control subsystem 110, at least one processing subsystem 120 and at least one acceleration subsystem 140. In one embodiment, the system 100 is communicatively coupled to a data network via a network interface (not shown).

The global task control subsystem 110 is communicatively coupled to the at least one processing subsystem 120 and to the at least one acceleration subsystem 140. The global task control subsystem 110 includes a task creator 112 and a task terminator 114, communicatively coupled to a priority record 116.

The priority record 116 is a global list of the ID, the age, and the priority of all active tasks. When the system 100 includes more than one processing subsystem 120, the priority record 116 also includes information regarding to which of the instantiations of the processing subsystem the task is assigned. The priority record 116 is used for global scheduling decisions for the entire system 100. In one embodiment, the priority record 116 is implemented as a state machine and a storage element. In another embodiment, the priority record 116 is implemented as a FIFO storage element. In such other embodiment, the FIFO storage element is implemented as a set of flip-flops, general purpose registers, or memory of another type. In one embodiment, the priority record 116 includes a priority vector of sixteen (16) bits.

Data communication packets may be received by the system 100 from the data network via the network interface. Some of the received data communication packets may correspond to a task, and the task creator 112 responds to such data communication packets by creating the corresponding task in the system 100. In general, the task creator 112 creates tasks based upon the kind of activity the task creator 112 sees on the network interface. In general, the task creator 112 creates tasks in response to a set of conditions for which the task creator monitors on a network interface. In one embodiment, the task creator 112 is a hardware module. The task creator 112 interacts with software of the system 100. When the system 100 includes more than one processing subsystem 120, the task creator 112 determines on which of the instantiations of the processing subsystem to create each task. The determination is based at least in part on loading factors and on a hardware algorithm. The task creator 112 issues a unique task ID to each new task that enters the system 100. Such task will run in the system 100 until the task terminator 114 ends the task. An interval between when the task creator 112 initiates the task and when the task terminator 114 ends the task is called a lifetime of a task. During its lifetime, the task can cycle through different states. The task terminator 114 monitors clean-up conditions that are performed after completion of the processing of a particular task.

The at least one processing subsystem 120 is communicatively coupled to the at least one acceleration subsystem 140. The at least one processing subsystem 120 includes a task state tracker 122 communicatively coupled to a task scheduler 124 and to a main scheduling list (hereinafter "main list") 126. The main list 126 is communicatively coupled to a starvation list 128. The task scheduler 124 is communicatively coupled to a starvation monitor 130, to the starvation list 128 and to a central processing unit (CPU) 132. The starvation monitor 130 includes a counter 131.

The task state tracker 122 monitors a present state of each task in the system 100. In one embodiment, the task state tracker 122 is implemented as a state machine. The task state tracker 122 tracks the states through which each task transitions. The task state tracker 122 interacts with software of the system.

The main list 126 includes entries in a FIFO register; each entry includes an ID of a task. In one example of the system 100 with a single CPU, there can be up to sixteen (16) tasks running in the system concurrently. Therefore, in such one example of the system 100, there can be up to fifteen (15) entries in the main list 126. In general, the number of entries in the main list 126 is equal to the number of total tasks in the system 100 minus one. In such one example of the system 100, the ID of a task includes four (4) bits.

The main list 126 contains tasks that are in a ready-for-scheduling state. A task is not always in a ready-for-scheduling state. A task will be the next task to execute when it is the task in the ready-for-scheduling state with the highest priority. When a task is done executing, it leaves the ready-for-scheduling state. When a task re-enters the ready-for-scheduling state, the task may not have a same position in the main list 126 as it had the previous occasion that it was in the main list (in spite of the priority of such task remaining unchanged), if other tasks entered the ready-for-scheduling state before such task re-entered the ready-for-scheduling state.

Task IDs can be recycled. When a task with a particular ID, such as ID "A", is finished, task "A" exits the system 100. Thereafter, when a new and different task enters the system 100, the ID "A" is re-used for the new and different task. Task IDs have no relationship to the age or the priority of the task.

The main list 126 is continually updated. For example, when new tasks become ready-for-scheduling, they are added the main list 126. When a task in the main list 126 (and in the starvation list 128) starts executing on the CPU 132, it is removed from the main list (and from the starvation list). However, no new tasks are added to the starvation list 128 until after the starvation list becomes empty.

For example, after the starvation list 128 has been populated, e.g., with ten (10) tasks, assume that an eleventh ($11^{th}$) task becomes ready for scheduling. The $11^{th}$ task is added to the main list 126 at the time the $11^{th}$ task becomes ready for scheduling, but the eleventh task is not added to the starvation list 128 at the time the $11^{th}$ task becomes ready for scheduling. The $11^{th}$ task is added to the starvation list 128 only after the starvation list becomes empty, if, at the time that the starvation list becomes empty, the $11^{th}$ task is still in the main list 126.

All the tasks in the main list 126 and all the tasks in the starvation list 128 are in the ready-for-scheduling state. A task that is being executed by the CPU 132 is in the executing state, and such task cannot, at the same time, also be in the main list 126 or the starvation list 128. At any moment, there can be more than one task in the ready-for-scheduling state, but there can only be one task in the executing state.

When the CPU 132 is ready to take a new task, a task with the highest priority is the task taken by the CPU. When the CPU 132 is ready to accept a new task, the method takes a "snapshot" of the tasks in the main list 126, and the tasks in the main list that are not taken by the CPU 132 for execution are copied to the starvation list 128.

The content of the main list 126 is based upon information in the priority record 116 and information in the task state tracker 122. The priority record 116 is shared by the main list 126 and the starvation list 128.

The task scheduler 124 schedules a task and de-schedules a task. Because there can be more than one task in the ready-for-scheduling state, the scheduler 124 has to decide which task will be granted access to the CPU 132. The task scheduler 124 does so by selecting a ready-for-scheduling task that has a highest priority. The task scheduler 124 saves and restores context in the background while a task is being executed on the CPU 132. The task scheduler 124 also monitors lifetime of each task. The task scheduler 124 performs local scheduling for the instantiation of the processing subsystem 120 of which task scheduler is a portion. The task scheduler 124 interacts with software of the system 100. The task scheduler 124 has an ability to save and restore state information for tasks in a context memory so that the task scheduler 124 can schedule tasks on the CPU 132 transparently, such as how an operating system would schedule tasks. However, the system 100 does not require conventional operating system software.

If a current task is either finished running on the CPU 132, is running on the CPU for too long a time, or is making a request for a hardware acceleration operation to be done on behalf of the task ("invoking an accelerator"), then the task scheduler 124 selects the highest priority task in the main list as the next task that is to be run on the CPU.

In one embodiment, the task scheduler 124 includes hardware. In one embodiment, the task scheduler 124 includes state machines that schedule hardware contexts on the CPU 132. Hardware context shows the state of the CPU 132 for a given task. The task scheduler 124 includes storage that holds a current state of a task. In one embodiment, the storage includes general purpose registers.

The starvation list 128 contains tasks that were in a ready-for-scheduling state as of the time that the starvation list was populated, except for tasks that have been completed subsequent to the time that the starvation list was populated. Therefore, the starvation list 128 is a sub-set of the main list 126. The starvation list 128 provides a way of knowing how long a task in the main list 126 is waiting for scheduling. The starvation list 128 is initialized with ready-for-scheduling tasks that are not scheduled in a current scheduling session. Once the starvation list 128 is initialized, no new tasks are added to the starvation list until the starvation list becomes empty. A task in the starvation list 128 is removed when it is scheduled to the CPU 132. Tasks in the starvation list 128 are scheduled either due to implementing the starvation action in accordance with embodiments of the invention, or scheduled based on their original priority. With the method in accordance with embodiments of the invention, it is foreseeable that the starvation list 128 may never be accessed because tasks in the starvation list may be scheduled via the main scheduling scheme. If the starvation action is enabled, the starvation list 128 then becomes empty. If the starvation action is not enabled, the starvation list 128 may become empty by being scheduled via the main scheduling scheme (which may take an undesirably long time), or it may never become empty.

The starvation list 128 includes FIFO entries, each entry including an ID of a task. In one embodiment, the starvation list 128 is implemented as a FIFO register. In one embodiment, the starvation list 128 is implemented as a set of flip-flops or as another storage element. In such embodiment, the storage element is implemented as general purpose registers. In another embodiment, the starvation list 128 is implemented as a vector of bits, which is advantageously cost effective. Each bit represents a task. If the bit is set, it indicates the corresponding task is in the ready-for-scheduling state but did not get scheduled in previous scheduling sessions.

The starvation monitor 130 determines starvation status of tasks and selects a subsequent action based on the starvation status of the tasks. In one embodiment, the starvation monitor is coupled to a debugger (not shown). The starvation monitor 130 is programmable to a) report, for debug purposes, that a scheduling problem has occurred, or b) take remedial action to cause a starved task to be selected for scheduling, or do both a) and b). The starvation monitor 130 keeps a count of a number of times a task in the main list 126 gets pre-empted, by other tasks in the main list 126, from being scheduled. The counter 131 is incremented each time a task in the main list 126 gets scheduled. In one embodiment, a maximum value is selected for the count. Upon occurrence of the maximum value, one lower-priority task is allowed to go ahead of a higher priority task. The starvation monitor 130 monitors the tasks in the starvation list 128 (and, therefore, are also in the main list 126), but are being denied access to the CPU 132. The starvation monitor 130 keeps count of how many times a task in the starvation list 128 gets pre-empted from being scheduled. The starvation monitor 130 examines the starvation list 128 and a count of the counter 131 (hereinafter collectively "starvation information"). The starvation monitor 130 decides, using the starvation information, when to implement the secondary scheduling scheme. In one embodiment, the starvation monitor 130 may merely use starvation information for debug purposes only. The starvation information is updated at every context switch when the CPU 132 is servicing a new task. The counter 131 is reset when the task is serviced by the CPU 132. The starvation monitor 130 maintains a count of the number of times a task is being pre-empted because of other higher priority tasks.

The starvation monitor 130 includes logic circuitry that monitors the state of the starvation list 128 and the scheduling actions of the task scheduler 124, and, in response, controls the updating of the counter 131, the use of the starvation list 128 by task scheduler 124 upon occurrence of a starvation event, and assists with maintenance of the starvation list 128. Determination of a starvation event is further described with reference to decision diamond 224 of FIG. 2. Maintenance of the starvation list 128 by the starvation monitor 130 is performed in steps 220 and 230 of FIG. 2. Control over the updating of counter 131 by the starvation monitor 130 is further indicated in the flow of FIG. 2, specifically with regards to steps 210, 212 and 216, as well as steps 206, 222 and 226.

In one embodiment, the method sets a maximum value for the counter 131, and, if the counter 131 reaches the maximum value (hereinafter "threshold"), the task scheduler 124 selects the highest priority task in the starvation list 128 and schedules such task ahead of higher priority tasks that are in the main list 126. The threshold can be a fixed value or can be programmable. In the illustrated embodiments, the threshold has a fixed value of "3". In another embodiment, the threshold may have a fixed value of "10". In yet another embodiment, the threshold may have a fixed value of "100". The threshold can be a global value for all tasks, or different values for each task. The method effectively raises temporarily the priority of a starved task in the ready-for-scheduling state, but the method does not permanently alter the original priority of such task. Although the method may occasionally interfere with the main scheduling scheme, the method adheres to the original priority of tasks when it selects a starved task from the starvation list 128.

The counter 131 is initialized to a value when the starvation list 128 is populated. The counter 131 is reset to another value when the starvation list 128 becomes empty. Between when starvation list 128 is initialized and when the starvation list becomes empty, the counter 131 is incremented every time the CPU 132 takes a task that is not one of the tasks in the starvation list. When the CPU 132 takes a task that is in the starvation list 128, the counter 131 is re-initialized and starts counting again for the tasks that remain in the starvation list.

The counter 131 is updated every time the CPU 132 takes a task. In the illustrated embodiments, the counter 131 is updated in one of three ways: a) counter=0 (reset), if after the CPU took a task, the starvation list 128 is empty, b) counter=1, if the CPU took a task that was in the starvation list but it was not the last task in the starvation list i.e., there is still at least one task in the starvation list, and c) counter=count+1, if the CPU took a task that was not in the starvation list and the starvation list is not empty.

Although the method in accordance with one embodiment of the invention uses a technique of monitoring the counter 131 to determine whether there are any active entries in the starvation list 128, the counter is only one mechanism for indicating that the starvation list is empty. In other embodiments, another technique or another mechanism is used for indicating that the starvation list 128 is empty. In still other embodiments, both another technique and another mechanism are used for indicating that the starvation list 128 is empty.

The at least one acceleration subsystem 140 includes one or more acceleration unit(s) 142 communicatively coupled to an accelerator scheduler 144. The at least one acceleration subsystem 140 interacts with the at least one processing subsystem 120 and provides acceleration operations on behalf of tasks running on the CPU 132.

Figure 2:
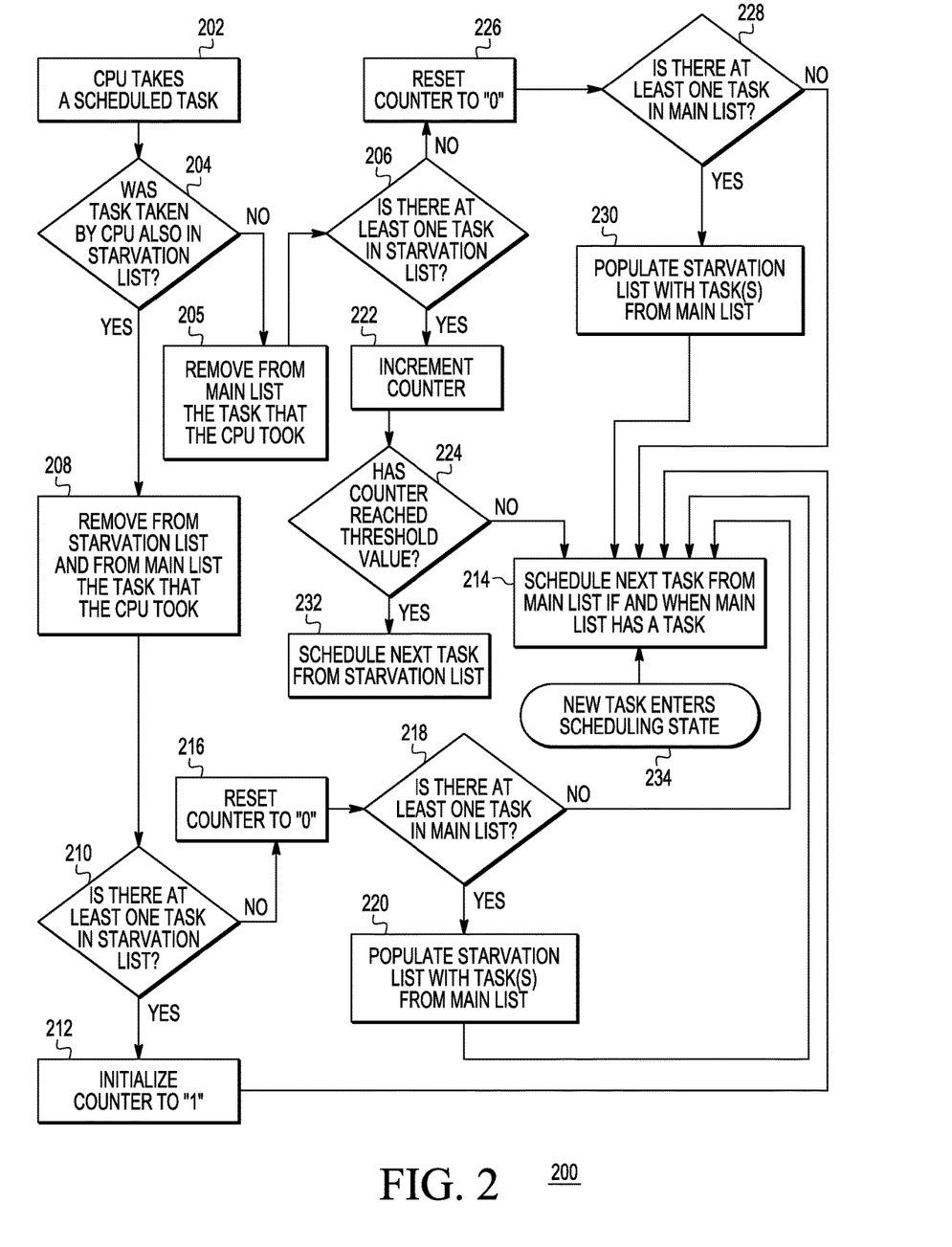
FIG. 2 is a simplified functional flow diagram of a method of controlling starvation in a data processing system in accordance with one embodiment of the invention.

FIG. 2 is a simplified functional flow diagram 200 of a method of controlling starvation in a data processing system, in accordance with one embodiment of the invention. The flow takes place in the system 100. The flow shown in FIG. 2 assumes that the following steps and events have occurred. The task ID and priority were assigned to each task when it entered the system 100. The main list 126 was provided and was populated with tasks that are in the ready-for-scheduling state. The starvation list 128 was provided and was populated with a duplicate set of tasks that are in the main list 126. When the CPU 132 takes the task with the highest priority, then such task is removed from both the main list 126 and from the starvation list 128. For example, compare FIG. 4 with FIG. 5 with respect to task B.

The flow starts at step 202, at which the CPU 132 takes a scheduled task from the main list 126. At step 204, a determination is made whether the task that was taken by the CPU 132 in step 202 was a task that is also in the starvation list 128. If the task that was taken by the CPU 132 in step 202 was not a task that is also in the starvation list 128, then the flow goes to step 205. At step 205, the task that was taken by the CPU in step 202 is removed from the main list 126, and the flow goes to step 206. If the task that was taken by the CPU 132 in step 202 was a task that is also in the starvation list 128, then the flow goes to step 208. At step 208, the task that was taken by the CPU in step 202 is removed from the main list 126 and from the starvation list 128, and the flow goes to step 210. At step 210, a determination is made whether there is at least one task in the starvation list 128. If there is at least one task in the starvation list 128, then the flow goes to step 212. At step 212, the counter 131 is initialized to a value (in one embodiment, the value is "1"), and then the flow goes to step 214. On the other hand, if, at step 210, a determination is made that there is not at least one task in the starvation list 128, then the flow goes to step 216. At step 216, the counter 131 is initialized to another value (in one embodiment, the other value is "0"). After step 216, the flow goes to step 218, at which a determination is made whether there is at least one task in the main list 126. If there is not at least one task in the main list 126, then the flow goes to step 214. If there is at least one task in the main list 126, then the flow goes to step 220, the starvation list 128 is populated again with the at least one task that is/are currently in the main list 126, and the flow goes to step 214.

At step 206, a determination is made whether there is at least one task in the starvation list 128. If there is at least one task in the starvation list 128, then the counter is incremented at step 222, and the flow continues to step 224. If there is not at least one task in the starvation list 128, then the counter is reset to the other value at step 226 (in one embodiment, the other value is "0"), and the flow continues to step 228. At step 228, a determination is made whether there is at least one task in the main list 126. If there is not at least one task in the main list 126, then the flow goes to step 214. If there is at least one task in the main list 126, then, at step 230, the starvation list 128 is populated again with tasks that are in the main list, and the flow goes to step 214.

At step 224, a determination is made whether the counter 131 has reached its threshold value. If the counter 131 has reached its threshold value, then, at step 232, the next task that is scheduled for execution on the CPU 132 is selected from the starvation list 128. Subsequent to step 232, the flow may return to step 202. If the counter 131 has not reached its threshold value, then the flow goes to step 214. At step 214, the next task that is scheduled for execution on the CPU 132 is selected from the main list 126, if and when the main list has a task. Step 234 indicates that a new task may enter the ready-for-scheduling state at any context switch, and such new task is added to the main list 126.

FIGS. 3-16 show an example of controlling starvation in a data processing system by the method in accordance with one embodiment of the invention. Each task is identified by a letter of the alphabet. Each task has a priority. In this example, eight (8) tasks, tasks A, B, C, D, E, F, G and H, are in the system 100 and their priority are assigned in descending order with A having the highest priority and H having the lowest. Note that not all of the eight tasks that are in the system 100 are necessarily in the main list 126 at any given time. The main list 126 shows the tasks that are ready to be scheduled. The starvation list 128 shows the tasks in the main list 126 that have been preempted for some time. The counter 131 counts number of times the CPU 132 has serviced a task subsequent to the time that the starvation list 128 was most-recently populated. In this example, the threshold value for the counter 131 is "3" for triggering the selection of a task from the starvation list 128. In this example, tasks A, B and C are going in and out of scheduling states while tasks E and F are still in the ready-for-scheduling state. But because tasks A, B and C have higher priority, they maintain their position at the top of the main list 126, which is the cause of the starvation of tasks E and F. In this example, it is assumed that, at time=0, the CPU 132 is executing a task X.

Figure 3:
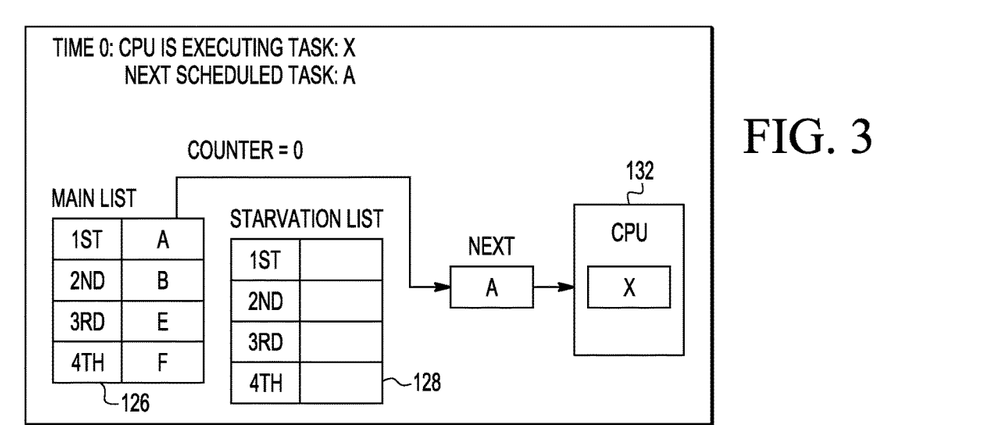
FIGS. 3-16 show an example of controlling starvation in a data processing system by the method in accordance with one embodiment of the invention.

Referring now to FIG. 3. At time=0, four (4) of the eight tasks in the system are in the main list 126. In this example, task A has the highest priority, next is task B, next is task E, and task F has the lowest priority among these four tasks. At time=0, the counter 131 is at its initial value. In this example, the initial value is "0" because the starvation list 128 is not populated. At time=0, task A is the next task that is scheduled to be executed on the CPU 132. This is because task A has the highest priority among the task in the main list 126.

Figure 4:
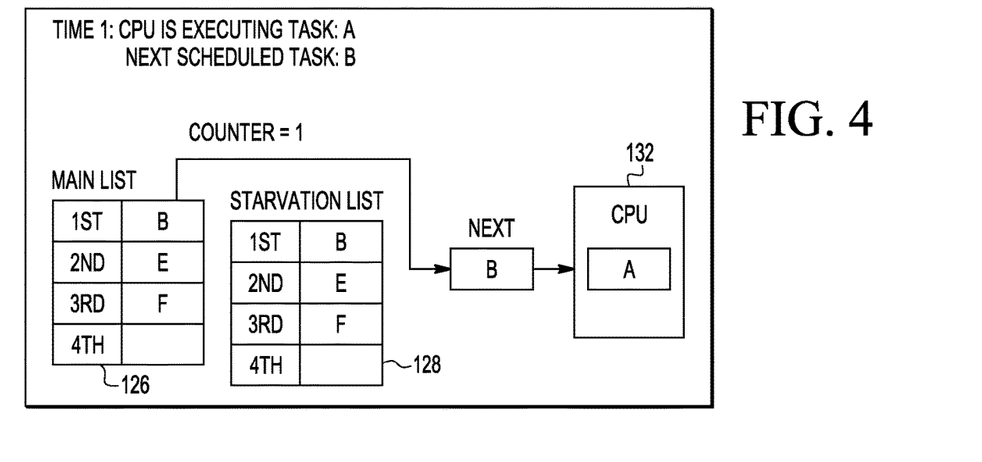

Referring now to FIG. 4. At time=1, the CPU 132 is no longer executing task X, the CPU 132 is executing task A, and task A is removed from the main list 126. At time=1, the other three tasks that are in the main list 126, tasks B, E and F, remain waiting in the main list 126. Because the tasks that remain waiting in the main list 126 may potentially be starved, the starvation list 128 is populated with the tasks that remain waiting in the main list 126. At time=1, the count=1 because the starvation list 128 is populated. At time=1, task B is the next task that is scheduled to be executed on the CPU 132. This is because task B has the highest priority among the tasks currently in the main list 126.

Figure 5:
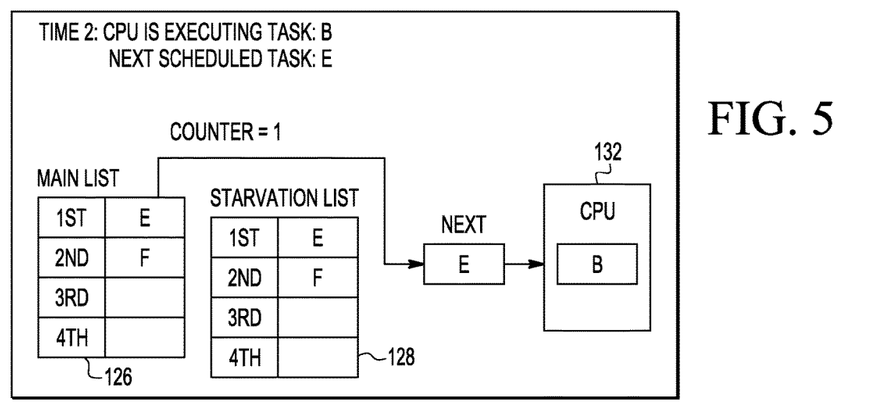

Referring now to FIG. 5. At time=2, the CPU 132 is no longer executing task A. The CPU 132 is executing task B, and, therefore, task B is removed from the main list 126 and from the starvation list 128. Tasks E and F remain in the starvation list 128. At time=2, the counter 131 is not incremented because task B was a task in the starvation list 128. At time=2, task E is the next task that is scheduled to be executed on the CPU 132. This is because task E has the highest priority among the tasks currently in the main list 126.

Figure 6:
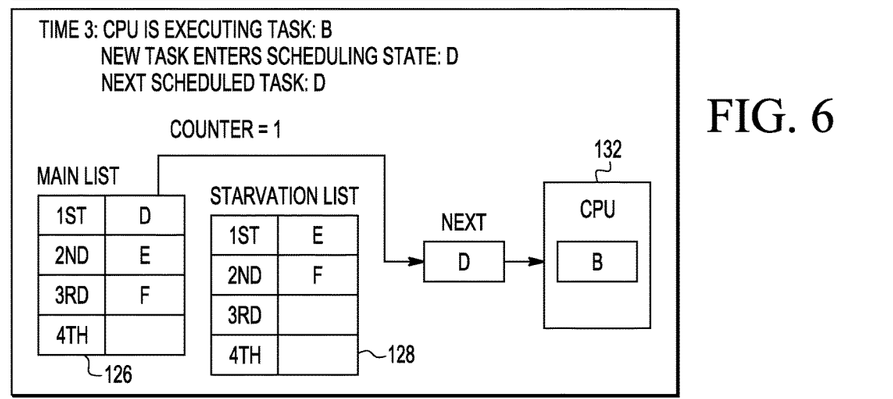

Referring now to FIG. 6. At time=3, the CPU 132 is still executing task B. At time=3, a new task, task D, enters the scheduling state. Task D has a higher priority than the other two tasks (task E and task F) in the main list 126, and, therefore, task D appears on the top of the main list 126. The new task D is not added to the starvation list 128. Tasks E and F remain in the starvation list 128. At time=3, the counter 131 is not incremented because no task that was not in the starvation list 128 has started executing. At time=3, task D is the next task that is scheduled to be executed on the CPU 132. This is because task D has the highest priority among the tasks currently in the main list 126.

Figure 7:
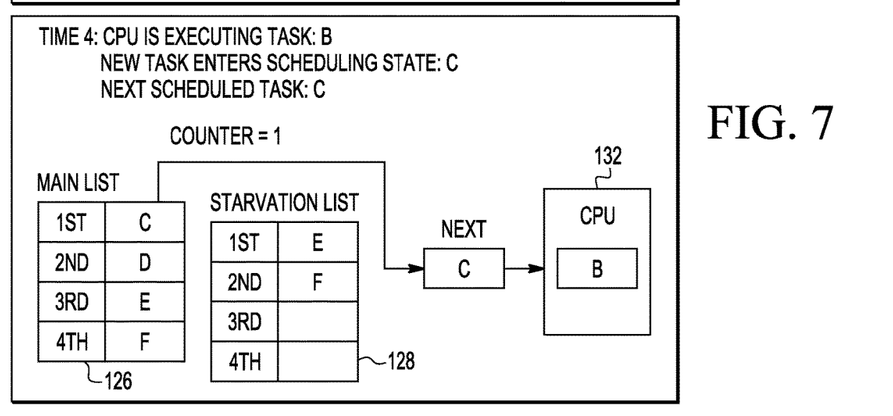

Referring now to FIG. 7. At time=4, the CPU 132 is still executing task B. At time=4, a new task, task C, enters the scheduling state. Task C has a higher priority than the other three tasks (task D, task E and task F) in the main list 126, and, therefore, task C appears on the top of the main list 126. At this time, tasks C, D, E and F are in the main list 126. The new task C is not added to the starvation list 128. Tasks E and F remain in the starvation list 128. At time=4, the counter 131 is not incremented because no task that was not in the starvation list 128 has started executing. In this example, count=1. At time=4, task C is the next task that is scheduled to be executed on the CPU 132. This is because task C has the highest priority among the tasks currently in the main list 126.

Figure 8:
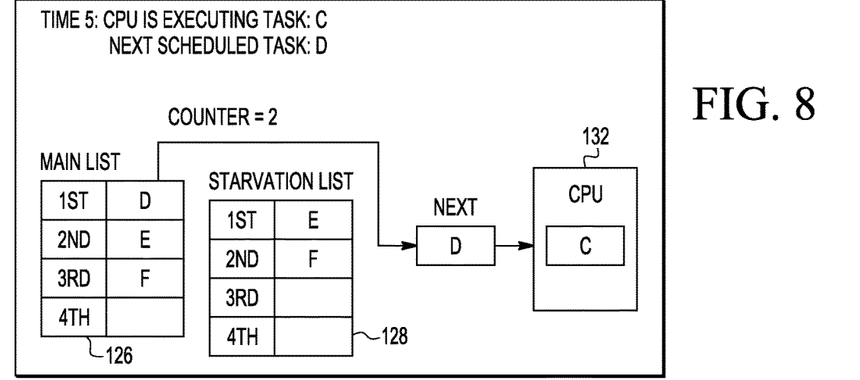

Referring now to FIG. 8. At time=5, the CPU 132 is no longer executing task B. The CPU 132 is executing task C, and, therefore, task C is removed from the main list 126. Tasks D, E and F remain in the main list 126. The starvation list 128 is unchanged. Tasks E and F remain in the starvation list 128. At time=5, the counter 131 is incremented because the task being executed, task C, is a task that was not in the starvation list 128. In this example, count=2. At time=5, task D is the next task that is scheduled to be executed on the CPU 132. This is because task D has the highest priority among the tasks currently in the main list 126.

Figure 9:
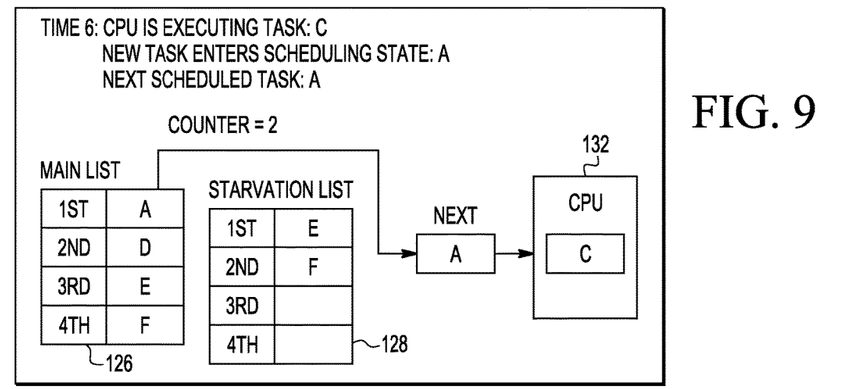

Referring now to FIG. 9. At time=6, the CPU 132 is still executing task C. At time=6, a new task, task A, enters the scheduling state. Task A has a higher priority than the other three tasks (tasks D, E and F) in the main list 126, and, therefore, task A appears on the top of the main list 126. Task A is not added to the starvation list 128. Tasks E and F remain in the starvation list 128. At time=6, the counter 131 is not incremented because no task that was not in the starvation list 128 started executing. In this example, count=2. At time=6, task A is the next task that is scheduled to be executed on the CPU 132. This is because task A has the highest priority among the tasks currently in the main list 126.

Figure 10:
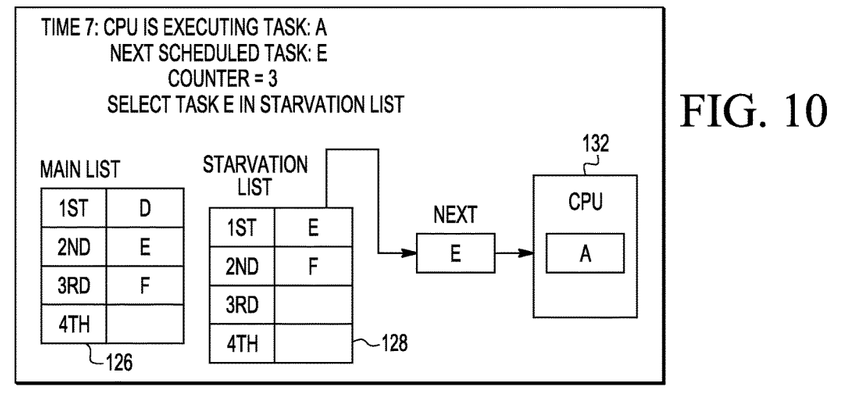

Referring now to FIG. 10. At time=7, the CPU 132 is no longer executing task C. The CPU 132 is executing task A, and, therefore, task A is removed from the main list 126. Tasks D, E and F remain in the main list 126. The starvation list 128 is unchanged. Tasks E and F remain in the starvation list 128. At time=7, the counter 131 is incremented because the task being executed, task A, is a task that was not in the starvation list 128. In this example, count=3. At time=7, a task from the starvation list 128 is the next task that is scheduled to be executed on the CPU 132 because the value of the counter 131 is now equal to the threshold value for triggering selection of the next task from the starvation list 128, rather than from the main list 126. Task E is the next task that is scheduled to be executed on the CPU 132. This is because task E has the highest priority among the tasks currently in the starvation list 128.

Figure 11:
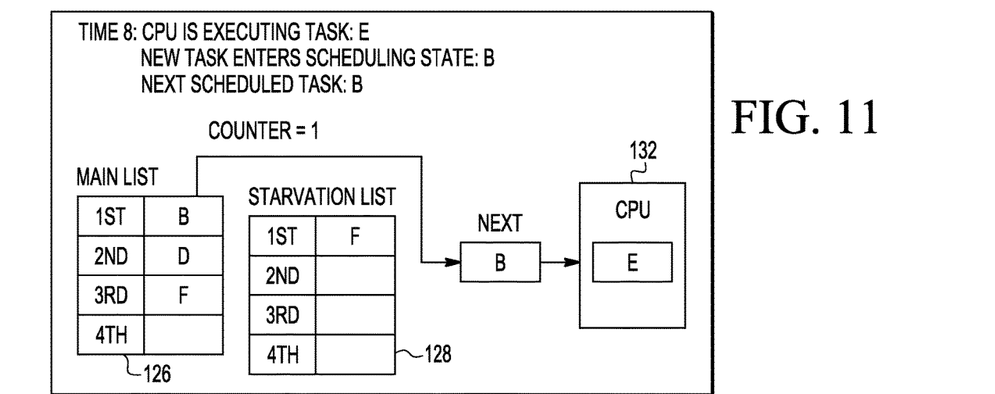

Referring now to FIG. 11. At time=8, the CPU 132 is no longer executing task A. The CPU 132 is executing task E, and, therefore, task E is removed from the main list 126 and from the starvation list 128. At time=8, a new task, task B, enters the scheduling state. Task B has a higher priority than the other two tasks (task D and task F) in the main list 126, and, therefore, task B appears on the top of the main list 126. At this time, tasks B, D and F are in the main list 126. The new task B is not added to the starvation list 128. Task F remains in the starvation list 128. At time=8, the counter 131 is reset because a task that was in the starvation list 128 started executing. The counter 131 is reset to an initialization value that indicates that a task in the starvation list 128 started executing, and that at least one task remains in the starvation list 128. In this example, the counter 131 is reset to the initialization value of "1". At time=8, task B is the next task that is scheduled to be executed on the CPU 132. This is because task B has the highest priority among the tasks currently in the main list 126.

Figure 12:
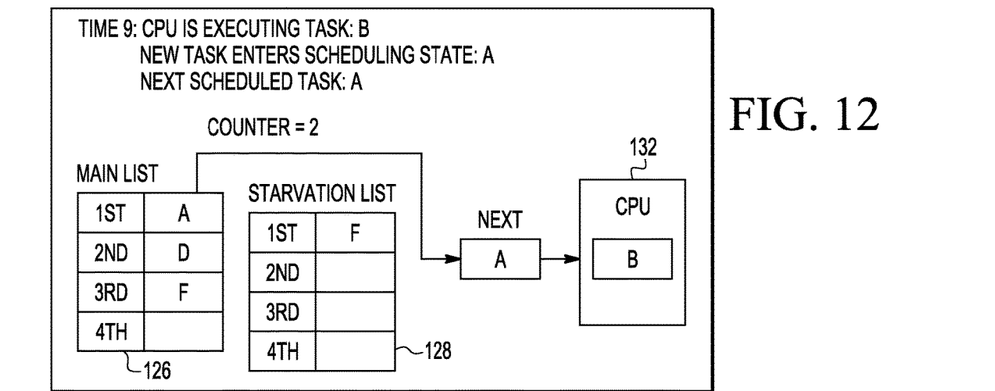

Referring now to FIG. 12. At time=9, the CPU 132 is executing task B, and, therefore, task B is removed from the main list 126. At time=9, a new task, task A, enters the scheduling state. Task A has a higher priority than the other two tasks (tasks D and F) in the main list 126, and, therefore, task A appears on the top of the main list 126. Task A is not added to the starvation list 128. Task F remains in the starvation list 128. At time=9, the counter 131 is incremented because the task being executed, task B, is a task that was not in the starvation list 128. At time=9, count=2. At time=9, task A is the next task that is scheduled to be executed on the CPU 132. This is because task A has the highest priority among the tasks currently in the main list 126.

Figure 13:
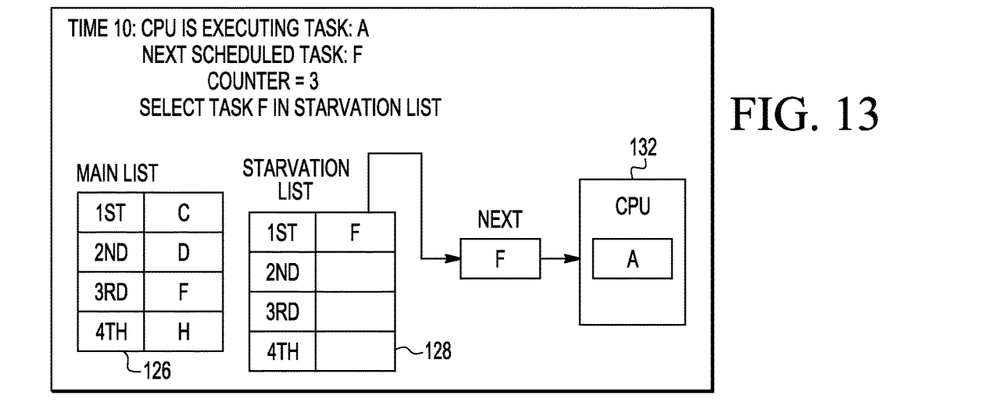

Referring now to FIG. 13. At time=10, the CPU 132 is no longer executing task B. The CPU 132 is executing task A, and, therefore, task A is removed from the main list 126. At time=10, two new tasks, task C and task H, enter the scheduling state. At time=10, tasks C, D, F and H are in the main list 126. Note that new task C has a higher priority than the other three tasks in the main list 126. Note that new task H has a lower priority than the other three tasks in the main list 126. The starvation list 128 is unchanged. Task F remains in the starvation list 128. At time=10, the counter 131 is incremented because the task being executed, task A, is a task that was not in the starvation list 128. At time=10, count=3. At time=10, a task from the starvation list 128 is the next task that is scheduled to be executed on the CPU 132 because the value of the counter 131 is now equal to the threshold value "3" for triggering selection of the next task from the starvation list 128, rather than from the main list 126. Task F (and not task C) is the next task that is scheduled to be executed on the CPU 132. This is because task F has the highest priority among the tasks currently in the starvation list 128. At this juncture, task F is the only task currently in the starvation list 128.

Figure 14:
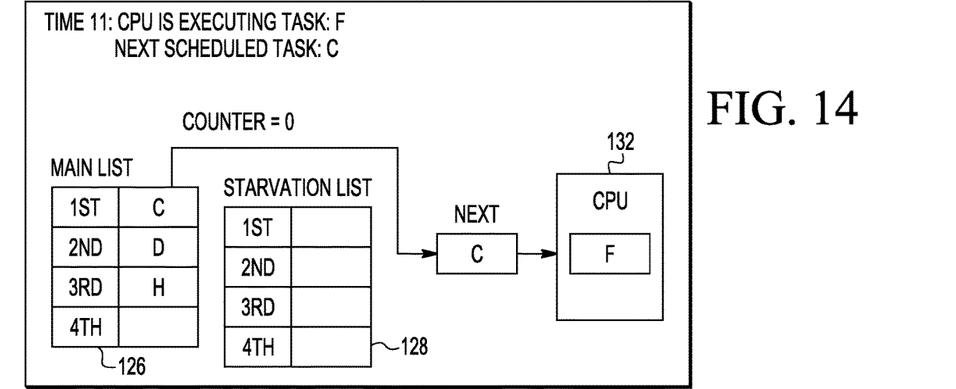

Referring now to FIG. 14. At time=11, the CPU 132 is no longer executing task A. The CPU 132 is executing task F, and, therefore, task F is removed from the main list 126 and from the starvation list 128. At time=11, tasks C, D and H are in the main list 126. There are no tasks in the starvation list 128. At time=11, the counter 131 is reset (step 216) because a task that was in the starvation list 128 started executing. The counter 131 is reset to an initialization value because a task in the starvation list 128 started executing (step 204=YES), and because the starvation list 128 is empty (step 210=NO). In this example, the counter 131 is reset to the starting value of "0". At time=11, task C is the next task that is scheduled to be executed on the CPU 132. This is because task C has the highest priority among the tasks currently in the main list 126.

Figure 15:
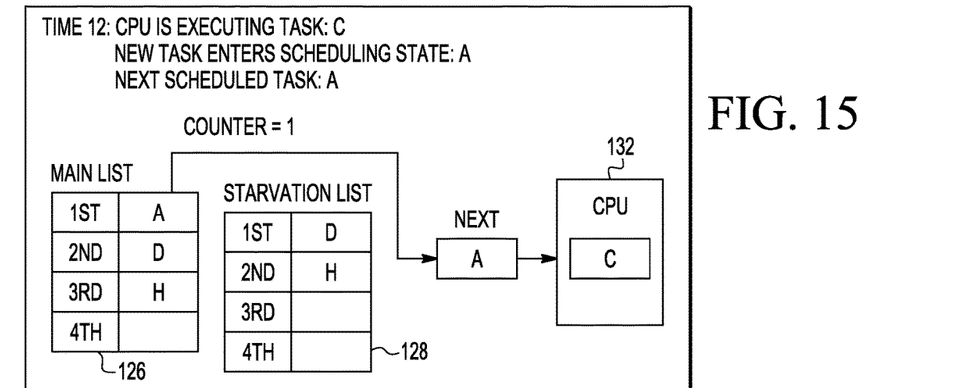

Referring now to FIG. 15. At time=12, the CPU 132 is no longer executing task F, the CPU 132 is executing task C, and task C is removed from the main list 126. At time=12, a new task, task A, enters the scheduling state. Task A has a higher priority than the other two tasks (task D and task H) in the main list 126, and, therefore, task A appears on the top of the main list 126. At this time, tasks A, D and H are in the main list 126. At time=12, the other two tasks that are in the main list 126, tasks D and H, remain waiting in the main list 126. Because the tasks that remain waiting in the main list 126 may potentially be starved (step 218=YES), the starvation list 128 is re-populated with the tasks that remain waiting in the main list 126, as of time=12 (step 220). Tasks D and H are in the starvation list 128. At time=12, the count=1 because the starvation list 128 is populated. At time=12, task A is the next task that is scheduled to be executed on the CPU 132. This is because task A has the highest priority among the tasks currently in the main list 126.

Figure 16:
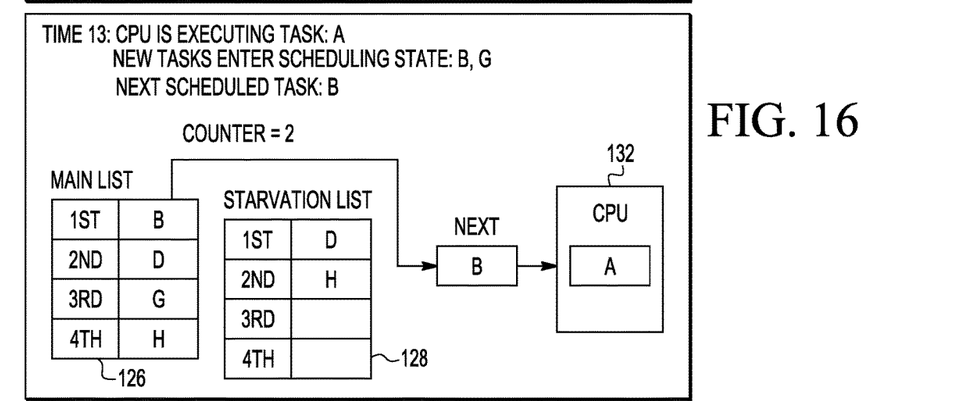

Referring now to FIG. 16. At time=13, the CPU 132 is no longer executing task C. The CPU 132 is executing task A, and, therefore, task A is removed from the main list 126. At time=13, two new tasks, task B and task G, enter the scheduling state. At time=13, tasks B, D, G and H are in the main list 126. Note that new task B has a higher priority than the other three tasks in the main list 126. Note that new task G has a lower priority than tasks band D, but a higher priority than task H. The starvation list 128 is unchanged. Task D and H remain in the starvation list 128. At time=13, the counter 131 is incremented because the task being executed, task A, is a task that was not in the starvation list 128. At time=13, count=2. At time=13, task B is the next task that is scheduled to be executed on the CPU 132. This is because task B has the highest priority among the tasks currently in the main list 126. FIGS. 3-16 demonstrate that the task is that is being executed by the CPU 132 is never, at the same time, also in the main list 126 or in the starvation list 128.

Figure 17:
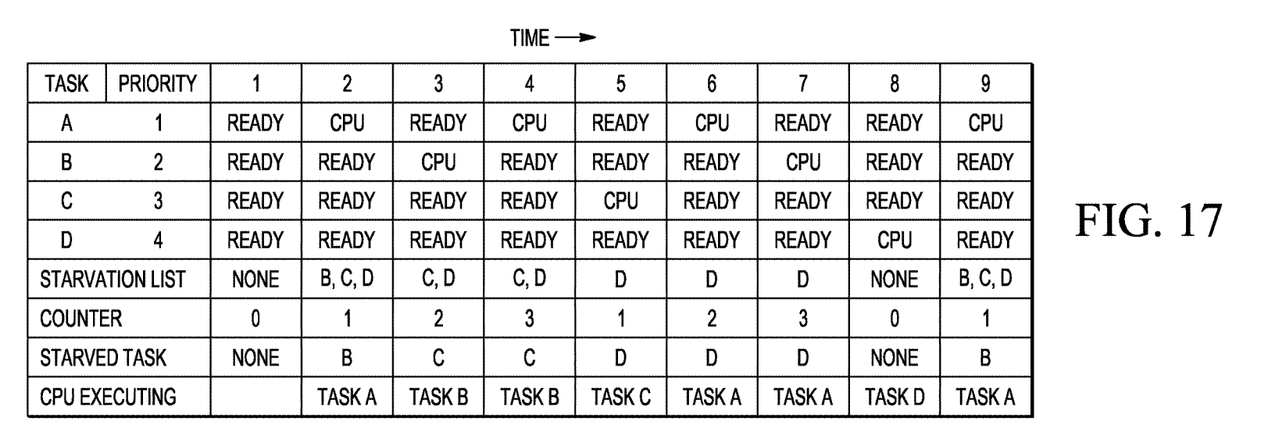
FIG. 17 is a chart that shows another example of controlling starvation in a data processing system by the method in accordance with one embodiment of the invention.

FIG. 17 is a chart that shows another example of controlling starvation in a data processing system by the method in accordance with one embodiment of the invention. In this example, four (4) tasks, tasks A, B, C and D, are in the system 100 and their priority are assigned in descending order with A having the highest priority and D having the lowest. In this example, the threshold value for the counter 131 is "3" for triggering the selection of a task from the starvation list 128.

At time=1, all four tasks are ready for scheduling; therefore, all four tasks are in the main list 126. There are no tasks in the starvation list 128; accordingly, no tasks are being starved. The counter 131 has a value of "0" because the starvation list is empty. At time=1, the CPU 132 is not executing any task.

At time=2, the CPU 132 is executing task A. Tasks B, C and D remain ready for scheduling and continue to be in the main list 126; therefore, tasks B, C and D may potentially be starved because they have not yet been executed, whereas task A is being executed. Accordingly, tasks B, C and D are also in the starvation list 128. The counter=1 because the starvation list is populated. At time=2, the CPU 132 is executing task A.

At time=3, the CPU 132 is done executing task A, and the counter 131 has been incremented. The CPU 132 is now executing task B. Therefore, task B has been removed from the starvation list 128. Tasks A, C and D are ready for scheduling and are in the main list 126. Tasks C and D may potentially be starved because tasks C and D have not yet been executed, whereas task A has been executed. Accordingly, tasks C and D are also in the starvation list 128. At time=3, count=2. At time=3, the CPU 132 is executing task B.

At time=4, the CPU 132 is done executing task B, and the counter 131 has been incremented. The CPU 132 is now executing task A. Tasks B, C and D are ready for scheduling and are in the main list 126. Tasks C and D may potentially be starved because tasks C and D have not yet been executed, whereas task B has been executed. Accordingly, tasks C and D remain in the starvation list 128. At time=4, count=3. Because the threshold=3, the next task will be selected from the starvation list 128, and not from the main list 126.

At time=5, the CPU 132 is done executing task A, and the counter 131 has been reset to "1". The CPU 132 is now executing task C, which has been selected from the starvation list 128. Task C has been removed from the starvation list 128. Tasks A, B and D are ready for scheduling and are in the main list 126. Task D may potentially be starved because task D have not yet been executed, whereas tasks A, B and C have been executed. Accordingly, task D remains in the starvation list 128. At time=5, count=1. The counter is reset to "1" because the task that is executing on the CPU 132, task C, is a task selected from the starvation list 128.

At time=6, the CPU 132 is done executing task C, and the counter 131 has been incremented. The CPU 132 is now executing task A. Tasks B, C and D are ready for scheduling and are in the main list 126. Task D remains in the starvation list 128. At time=6, count=2.

At time=7, the CPU 132 is done executing task A, and the counter 131 has been incremented. The CPU 132 is now executing task B. Tasks A, C and D are ready for scheduling and are in the main list 126. Task D remains in the starvation list 128. At time=7, count=3. Because the threshold=3, the next task will be selected from the starvation list 128, and not from the main list 126.

At time=8, the CPU 132 is done executing task B, and the counter 131 has been reset to "0". The CPU 132 is now executing task D, which has been selected from the starvation list 128. Task D has been removed from the starvation list 128, and, as a result, there are now no tasks in the starvation list. Tasks A, B and C are ready for scheduling and are in the main list 126. At time=8, count=0. The counter is reset to "0" because there are no tasks in the starvation list 128.

At time=9, the CPU 132 is done executing task D, and the counter 131 has been incremented to "1". The CPU 132 is now executing task A. Tasks B, C and D are ready for scheduling and are in the main list 126. Tasks B, C and D may potentially be starved because they have not yet been executed, whereas task A has been executed. Accordingly, tasks B, C and D are in the starvation list 128. At time=9, count=1.

Figure 18:
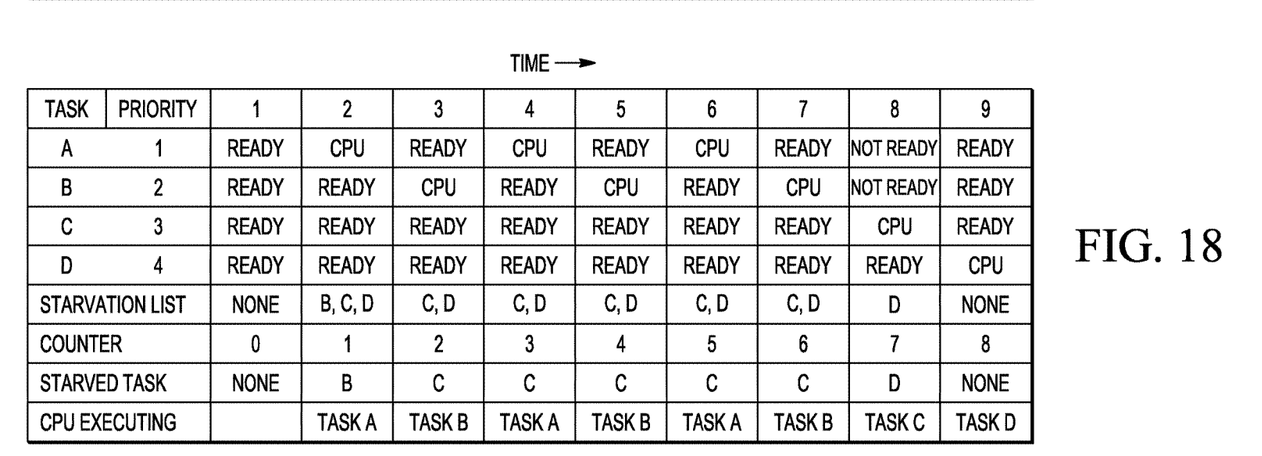
FIG. 18 is a chart that shows an example of monitoring starvation in a data processing system without also controlling the starvation, by the method in accordance with one embodiment of the invention.

FIG. 18 is a chart that shows an example of monitoring starvation in a data processing system without also controlling the starvation, by the method in accordance with one embodiment of the invention. The method determines which tasks are being starved, and for how long, but does not intervene. In this example, four (4) tasks, tasks A, B, C and D, are in the system 100 and their priority are assigned in descending order with A having the highest priority and D having the lowest. The example shown in FIG. 18 is similar in some respects to the example shown in FIG. 17; therefore, the example shown in FIG. 18 will not be described in detail. In the example shown in FIG. 18, there is no threshold for the counter 131. As a result, the method in this example does not intervene to reduce starvation. The counter 131 is incremented at each occasion that a different task is executed. Advantageously, the count of the counter 131 can be monitored by a debugger. The count of the counter 131 can reveal the extent of starvation. In the example shown in FIG. 18, the counter 131 may be reset to an initial value if and when the starvation list 128 is re-populated subsequent to time=9.

In the example shown in FIG. 18, task C is not executed until time=8. Whereas, in the example shown in FIG. 17, the method intervenes to cause task C to execute at time=5, thereby reducing starvation time. In the example shown in FIG. 18, task D is not executed until time=9. Whereas, in the example shown in FIG. 17, the method intervenes to cause task D to execute at time=8, thereby reducing starvation time.

In one embodiment, the system 100, which has a main scheduling scheme and a secondary scheduling scheme, includes a global task control subsystem 110. The global task control subsystem 110 includes a task creator 112 and a task terminator 114, each coupled to a priority record 116. The task creator 112 assigns a task ID and a priority to each new task that enters the system 100. The priority record 116 contains at least the ID and priority of all active tasks in the system 100. The system 100 also includes at least one processing subsystem 120 coupled to the global task control subsystem 110. The at least one processing subsystem 120 includes a task state tracker coupled to a task scheduler 124, to a main list 126 and to a CPU 132. The task scheduler 124 is coupled to a starvation list 128 and to a starvation monitor 130. The task scheduler 124 schedules and de-schedules tasks for execution on the CPU 132. The starvation monitor 130 determines a number of times that a task in the main list 126 is pre-empted, by other tasks in the main list, from being scheduled for execution on the CPU 132.

One embodiment of the method in accordance with the invention includes the following steps. 1) Assigning to each task an ID and a priority when it enters the system 100. 2) Providing storage for a main list 126. 3) Populating the main list 126 with tasks that are in a ready-for-scheduling state, and including, for each such task, the priority information regarding the state. 4) Identifying tasks in the main list 126 that are potentially-starving tasks. Potentially-starving tasks are tasks that are pre-empted by a highest priority task, i.e., by a starvation-causing task. The potentially-starving tasks are all other tasks in the main list 126 other than the task that has the highest priority. The starvation-causing task can be any task. 5) Providing storage for a starvation list 128. 6) Populating the starvation list 128 with the identified potentially-starving tasks, and, for each such potentially-starving task, including the same priority information as in the main list 126. 7) Providing a counter 131. 8) Setting the counter 131 to an initial value, and preselecting a threshold value for the count of the counter 131. 9) Scheduling, for executing on the CPU 132, a task in the main list 126 that currently has the highest priority among all the tasks currently in the main list 126. Additional tasks may be added to the main list 126 at any time subsequent to step 9). Each such additional task may have a priority higher or lower than the tasks in the starvation list 128. However, such additional tasks are not also added to the starvation list 128 at the same time that they are added to the main list 126. 10) Removing the scheduled task from the main list 126 and from the starvation list 128 after completion of the task. 11) Counting, by incrementing the counter 131, each time that any task in the main list 126 is executed on the CPU 132. Each occasion that any task in the main list 126 is executed on the CPU 132 is synonymous with each occasion that the tasks in the starvation list 128 get pre-empted by any higher priority task. 12) Repeating steps 9) to 11) until the counter 131 reaches the threshold value, then, scheduling a highest priority task in the starvation list 128 to go ahead of all other tasks (including higher-still priority tasks) that are, at that time, in the main list 126. 13) After completion of the task that was scheduled for the sole reason that the threshold value was reached, removing such task from the starvation list 128 and from the main list 126. All other tasks in the starvation list 128 remain in the starvation list. 14) Resetting the counter 131 to its initial value, and start counting again. 15) Repeating steps 9) to 14), until there are no more tasks in the starvation list 128. 16) Repopulating the starvation list 128 with a new set of potentially-starving tasks. The new set of potentially-starving tasks consists of all other tasks currently in the main list 126 other than the task that has the highest priority. The new set of potentially-starving tasks includes all tasks that were added to the main list 126 subsequent to the previous step of populating the starvation list 128, provided that such tasks are still in the main list 126.

The method in accordance with embodiments of the invention is advantageous in a data processing system that has a large number of tasks. The method in accordance with embodiments of the invention is particularly advantageous in a data processing system wherein the tasks have a long lifetime.

The method in accordance with embodiments of the invention helps to guard against undesirable scheduling behavior if software and/or hardware of a data processing system fail to distribute resources correctly. When the method in accordance with embodiments of the invention is implemented in a data processing system that is optimally designed, the counter 131 should never reach its limit and no interference with the main scheduling scheme occurs. But, when the method in accordance with embodiments of the invention is implemented in a data processing system that is not optimally designed, the method may to help mitigate undesirable scheduling behavior.

The method in accordance with embodiments of the invention does not directly target a task that causes the starvation; rather, the method advantageously focuses on the task that was affected.

The method in accordance with embodiments of the invention has the effect of only temporarily raising the original priority of a starving task. Once a task is serviced, it reverts to having its original priority. Advantageously, the method in accordance with embodiments of the invention does not permanently change the priority of any task.

With the method in accordance with embodiments of the invention, a task with the lowest priority may obtain access to the CPU 132 a fewest number of times; however, the task with the lowest priority is advantageously ensured of getting access to the CPU 132 at least once.

The term "coupled", as used herein, is defined as "connected", and encompasses the coupling of devices that may be physically, electrically or communicatively connected, although the coupling may not necessarily be directly, and not necessarily be mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The term "coupled", as used herein, is not intended to be limited to a direct coupling or a mechanical coupling, and that one or more additional elements may be interposed between two elements that are coupled. It is understood that the terms so used are interchangeable under appropriate circumstances such that the embodiments of the invention described herein are, for example, capable of operation in other orientations than those illustrated or otherwise described herein.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims.

The Detailed Description section, and not the Abstract section, is intended to be used to interpret the claims. The Abstract section may set forth one or more but not all embodiments of the invention, and the Abstract section is not intended to limit the invention or the claims in any way.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages or solutions to problems that are described herein with regard to specific embodiments are not intended to be construed as a critical, required, or essential feature or element of any or all the claims.

What is claimed is:

1. A method within a data processing system, comprising:
grading each task that enters the data processing system with a priority value and with a lifetime;
populating a main list with tasks in the data processing system that are in a ready-for-scheduling state;
scheduling, for executing on a central processing unit (CPU), a task in the main list that has a highest priority value;
identifying tasks in the main list that are not scheduled for execution on the CPU;
providing a starvation list;
copying into the starvation list tasks in the main list that are not scheduled for execution on the CPU;
executing on the CPU a task in the main list that has a highest priority among the tasks currently in the main list;
removing such task from the main list and from the starvation list;
repeating, a preselected number of times, the executing and the removing;
scheduling, for execution on the CPU, a highest priority task in the starvation list prior to scheduling other tasks that are currently in the main list;
providing a counter;
counting, by the counter, each occasion that any task that is not also in the starvation list is executed on the CPU;
determining whether a current number of occasions that any task not in the starvation list is executed on the CPU is equal to a threshold value, and
if so, then schedule for execution on the CPU a highest priority task in the starvation list prior to scheduling for execution on the CPU any other task in the main list, and after completion of the execution on the CPU of the highest priority task in the starvation list, removing such task from the starvation list and from the main list, and
if not so, then perform again the steps of executing, removing and counting; and
responsive to determining that there are no tasks in the starvation list and that there is at least one task in the main list, re-copying into the starvation list tasks in the main list that are not scheduled for execution on the CPU.

2. The method within a data processing system of claim 1, wherein the data processing system includes:
a global task control subsystem; and
at least one processing subsystem coupled to the global task control subsystem, the at least one processing subsystem including:
a task scheduler coupled to the main list, to the starvation list and to the CPU, wherein the task scheduler schedules and de-schedules tasks for execution on the CPU using one of a main scheduling scheme and a secondary scheduling scheme, and
a starvation monitor, coupled to the task scheduler, wherein the starvation monitor monitors the starvation list, and, if the starvation list is empty, the starvation monitor copies into the starvation list ready-for-scheduling tasks in the main list that are not scheduled for execution on the CPU, wherein the starvation monitor determines a number of times that any task in the starvation list is pre-empted from being scheduled for execution on the CPU as a result of another task being scheduled for execution on the CPU using the main scheduling scheme.

3. The method within a data processing system of claim 2, wherein the starvation monitor determines, using the starvation list and the number of times that any task in the starvation list is pre-empted, when to implement the secondary scheduling scheme.

4. The method within a data processing system of claim 3, wherein the secondary scheduling scheme schedules, for execution on the CPU, the highest priority task in the starvation list prior to scheduling, pursuant to the main scheduling scheme, other tasks that are currently in the main list.

5. The method within a data processing system of claim 2, wherein the at least one processing subsystem includes a task state tracker, coupled to the task scheduler, that monitors a present state of each task in the at least one processing subsystem.

6. The method within a data processing system of claim 2, wherein the global task control subsystem includes a task creator and a task terminator, each coupled to a priority record, wherein the task creator assigns a task ID and a priority to each new task that enters the system, and wherein the priority record contains at least the ID and priority of all active tasks in the system.

7. The method within a data processing system of claim 6, wherein the main list comprises entries in a first-in first-out (FIFO) register, each entry comprising an ID of a task.

8. The method within a data processing system of claim 6, wherein the starvation list comprises entries in a FIFO register, each entry comprising an ID of a task.

9. The method within a data processing system of claim 6, wherein the data processing system includes more than one processing subsystem, wherein the task creator determines on which of the more than one processing subsystem to create each task, and wherein the priority record also includes information regarding to which of the more than one processing subsystem the task is assigned.

10. The method within a data processing system of claim 6, wherein the data processing system is communicatively coupled to a data network, and wherein the task creator responds to data communication packets, which arrive via the data network.

11. The method within a data processing system of claim 2, including at least one acceleration subsystem, coupled to the global task control subsystem and to the at least one processing subsystem, wherein the acceleration subsystem interacts with the at least one processing subsystem and provides acceleration operations on behalf of tasks running on the CPU.

12. A method within a data processing system, comprising:
assigning priority information to each task that enters the data processing system;
providing storage for a main list;
populating the main list with tasks which entered the data processing system that are in a ready-for-scheduling state;
identifying tasks in the main list that are potentially-starving tasks;
providing storage for a starvation list;
populating the starvation list with the potentially-starving tasks such that the potentially-starving tasks remain in the main list;

scheduling, for executing on a CPU, a task in the main list that currently has a highest priority among tasks currently in the main list;

removing such scheduled task from the main list and, if such scheduled task is also in the starvation list, removing such scheduled task from the starvation list after the CPU executes the such scheduled task;

selecting a threshold value;

counting each occasion that any task that is not also in the starvation list is executed on the CPU;

determining whether a current number of occasions that any task not in the starvation list is executed on the CPU is equal to the threshold value, and
  if so, then schedule for execution on the CPU a highest priority task in the starvation list prior to scheduling for execution on the CPU any other task in the main list, and after completion of the execution on the CPU of the highest priority task in the starvation list, removing such task from the starvation list and from the main list, and
  if not so, then repeat steps of scheduling, removing and counting; and responsive to determining that there are no tasks in the starvation list and that there is at least one task in the main list, re-populate the starvation list with tasks from the main list.

13. The method of claim 12, further comprising:

providing a counter;

setting the counter to an initial value, wherein the threshold value corresponds to a certain count of the counter; and selectively incrementing the counter based on whether a task that is executed on the CPU is also in the starvation list.

14. The method of claim 13, further comprising:

determining whether there are tasks in the starvation list, and
  if there are tasks in the starvation list, then resetting the counter to the initial value, and repeat the steps from the step of scheduling to the step of determining, and
  if there are no tasks in the starvation list, then resetting the counter to another value, and repeat the steps from the step of identifying to the step of determining.

15. The method of claim 13, wherein the counter is incremented if the task that is executed on the CPU is not also in the starvation list, and the counter is not incremented if the task that is executed on the CPU is also in the starvation list.

* * * * *